United States Patent
Borate et al.

(10) Patent No.: US 11,755,420 B2
(45) Date of Patent: Sep. 12, 2023

(54) RECOVERY POINT OBJECTIVE OPTIMIZED FILE RECOVERY

(71) Applicant: Druva Inc., Santa Clara, CA (US)

(72) Inventors: Milind Borate, Pune (IN); Anand Apte, Pune (IN); Neeraj Thakur, Pune (IN)

(73) Assignee: Druva Inc., Santa Clara, CA (US)

( * ) Notice: Subject to any disclaimer, the term of this patent is extended or adjusted under 35 U.S.C. 154(b) by 340 days.

(21) Appl. No.: 16/951,579

(22) Filed: Nov. 18, 2020

(65) Prior Publication Data

US 2022/0100378 A1   Mar. 31, 2022

(30) Foreign Application Priority Data

Sep. 28, 2020  (IN) .............. 202041042054

(51) Int. Cl.
  *G06F 11/00*  (2006.01)
  *G06F 11/14*  (2006.01)
  *G06F 21/56*  (2013.01)

(52) U.S. Cl.
  CPC ...... *G06F 11/1458* (2013.01); *G06F 11/1446* (2013.01); *G06F 11/1469* (2013.01); *G06F 21/565* (2013.01); *G06F 21/568* (2013.01); *G06F 2221/033* (2013.01)

(58) Field of Classification Search
  CPC ............. G06F 11/1446; G06F 11/1458; G06F 11/1469; G06F 21/565; G06F 21/568
  See application file for complete search history.

(56) References Cited

U.S. PATENT DOCUMENTS

| | | | |
|---|---|---|---|
| 8,495,037 B1* | 7/2013 | Westenberg | G06F 21/56 707/698 |
| 9,785,773 B2* | 10/2017 | Falk | G06F 21/56 |
| 10,089,187 B1* | 10/2018 | Pecoraro | H04L 67/1097 |
| 10,423,782 B2* | 9/2019 | Muttik | G06F 11/1469 |
| 10,650,146 B1* | 5/2020 | Gaurav | G06F 21/565 |
| 2011/0138112 A1* | 6/2011 | Chiang | G06F 3/0664 711/E12.008 |
| 2018/0307839 A1* | 10/2018 | Bhave | G06F 21/566 |
| 2020/0097653 A1* | 3/2020 | Mehta | G06F 21/80 |

* cited by examiner

*Primary Examiner* — Marc Duncan
(74) *Attorney, Agent, or Firm* — Fenwick & West LLP (57) ABSTRACT

A system includes a data store and a data management server. The data store stores a plurality of backup snapshots that capture states of a device at different times. The data management server receives a request to restore the device that is potentially malware affected. The data management server retrieves a first backup snapshot of the device. The data management server determines that a first file stored in the first backup snapshot is malware affected. The data management server checks one or more corresponding versions of the first file captured in one or more previous backup snapshots to identify a clean version of the first file. The data management server determines that a second file stored in the first backup snapshot is clean. The data management server restores data in the device.

18 Claims, 7 Drawing Sheets

| Date | Backup | Files / Versions | Status |
|---|---|---|---|
| July 1 | #11 | File 1 / Version 1<br>File 2 / Version 3<br>File 3 / Version 2<br>File 4 / Version 10<br>File 5 / Version 12<br>File 6 / Version 20<br>File 7 / Version 25 | Clean<br>Clean<br>Clean<br>Clean<br>Clean<br>Clean<br>Clean |
| July 2 | #12 | File 1 / Version 2<br>File 2 / Version 4<br>File 3 / Version 3<br>File 4 / Version 11<br>File 5 / Version 13<br>File 6 / Version 21<br>File 7 / Version 26 | Clean<br>Encrypted<br>Malware<br>Clean<br>Clean<br>Clean<br>Clean |
| July 3 | #13 | File 1 / Version 3<br>File 2 / Version 5<br>File 3 / Version 4<br>File 4 / Version 12<br>File 5 / Version 14<br><br>File 7 / Version 27 | Encrypted<br>Encrypted<br>Malware<br>Clean<br>Clean<br><br>Malware |
| July 4 | #14 | File 1 / Version 4<br>File 2 / Version 6<br>File 3 / Version 5<br>File 4 / Version 13<br>File 5 / Version 15 | Encrypted<br>Encrypted<br>Malware<br>Clean<br>Encrypted |
| July 5 | #15 | File 1 / Version 2<br>File 2 / Version 3<br>File 3 / Version 2<br>File 4 / Version 13<br>File 5 / Version 14<br>File 6 / Version 21<br>File 7 / Version 26 | Clean<br>Clean<br>Clean<br>Clean<br>Clean<br>Clean<br>Clean |

RECOVERY POINT OBJECTIVE OPTIMIZED FILE RECOVERY

CROSS REFERENCE TO RELATED APPLICATION

This application claims the benefit of priority to Indian Provisional Application No. 202041042054, filed on Sep. 28, 2020 and which is incorporated herein by reference in its entirety for all purposes.

TECHNICAL FIELD

The disclosed embodiments are related to data management systems, and, more specifically, to data management servers that may recover one or more files after a malware attack.

BACKGROUND

To protect against data loss, organizations may periodically backup data to a backup system and restore data from the backup system. In some cases, one or more files being backed up may become affected by malware. Malware attacks may take place over a long period of time (e.g., over several months) and affect each file in different ways (e.g., encrypt, lock out, or infect). To recover from malware attacks, organizations may restore data from the backup system. However, the recovered files oftentimes are too old to be relevant and useful.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures (FIGs.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed are example embodiments related to systems and processes of data retrieval and/or restorations associated with malware affected files that improve the efficiency and cost of performing such restorations. The systems and processes also improve on the relevancy of the restored files for a user. A plurality of backup snapshots that capture states of a device at different times may periodically be generated and sent to a data store for storage. Over time, the device may become malware affected. In order to restore the device with clean data, a request may be provided to a data management server to restore one or more individual files captured in the plurality of backup snapshots stored in the data store.

In accordance with an embodiment, the data management server may retrieve a first backup snapshot of the device and determine whether the files stored in the first backup snapshot are malware affected. In one example, the first backup snapshot is a most recent backup snapshot. In another example, the first backup snapshot is any backup snapshot that was captured and stored prior to the request. In an embodiment, a first file that is malware affected may be compromised due to ransomware and/or one or more viruses. The data management server checks one or more corresponding versions of the first file captured in one or more previous backup snapshots to identify a clean version of the first file. In one embodiment, a clean version of a file is a version in which the file is not encrypted and not malware affected.

In accordance with an embodiment, to further improve the relevancy of the restored files, a data management server may check the previous backup snapshots one at a time for a clean version of the first file. In one embodiment, the data management server may check the first backup snapshot and previous backup snapshots (if needed) to find a clean version of any or all of the other files captured in the first backup snapshot. In an embodiment, the data management server may determine that a second file stored in the first backup snapshot is clean. The data management server may restore data in the device. In an embodiment, the restored data may include the clean version of the first file restored from a previous backup snapshot and the second file restored from the first backup snapshot. In some embodiments, the data management server may restore the data when clean versions of the files captured in the first backup snapshot have been identified.

The processes described may optimize the recovery point objective (RPO) for an organization. For example, the organization may backup their data less frequently and still be able to recover clean data from backups that is useable. In another example, the organization may not need to go as far back in time to recover clean data from previous backups. In addition, the processes may decrease the costs associated with data retrieval and/or data restoration. Costs may be direct monetary costs to be spent to perform an action (e.g., read, write, store) or other costs such as computer resources and time in performing an action. For example, an organization may save on an amount of manual labor needed to retrieve and/or restore clean data. The retrieval and restoration of clean versions of files from various backup snapshots, provides an efficient method for data restoration that is relevant to the user.

Example System Environment

Figure 1:
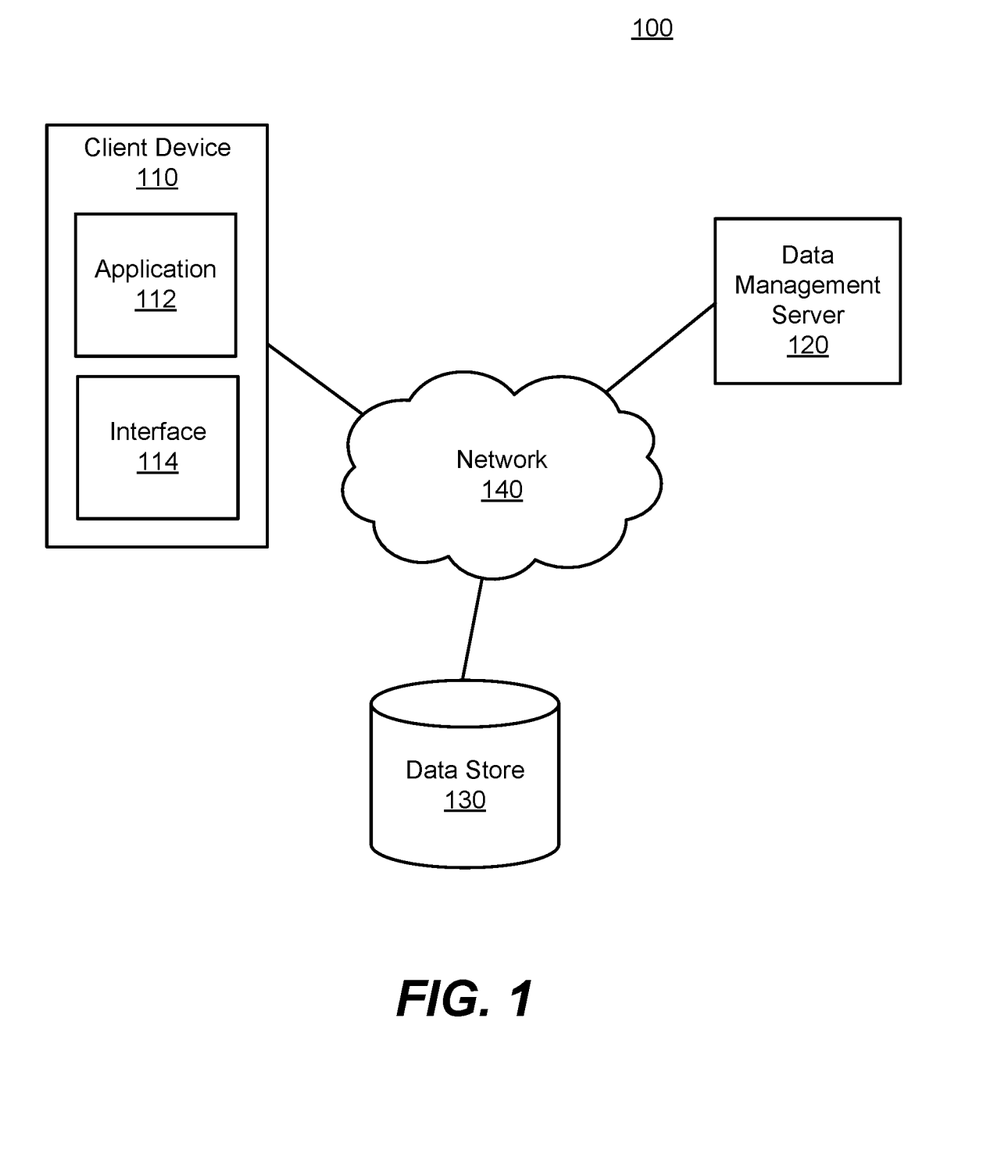
FIG. 1 is a block diagram illustrating a system environment of an example data management system, in accordance with an embodiment.

Figure (FIG.) 1 is a block diagram illustrating a system environment 100 of an example data management system, in accordance with an embodiment. By way of example, the system environment 100 may include a client device 110, a data management server 120, a data store 130, and a network 140. In various embodiments, the data management system 100 may include fewer and additional components that are not shown in FIG. 1. While each component in the system 100 is referred to as in a singular form, the system 100 may include one or more of those components. For example, the data management server 120 may manage the data backup and recovery of multiple client devices 110.

The various components in the data management system 100 may each correspond to a separate and independent entity or some of the components may be controlled by the same entity. For example, in one embodiment, the data management server 120 and the data store 130 may be controlled and operated by the same data storage provider company while the client device 110 may be controlled by an individual client. In another embodiment, the data management server 120 and the data store 130 may be controlled by separate entities. For example, the data management server 120 may be an entity that utilizes various popular cloud data service providers as data stores 130. The components in the data management system 100 may communicate through the network 140. In some cases, some of the components in the environment 100 may also communicate through local connections. For example, the data management server 120 and the data store 130 may communicate locally.

A client device 110 may be a computing device that can transmit and/or receive data via the network 140. Users may use the client device to perform functions such as accessing, storing, creating, and modifying files, accessing digital content, and executing software applications. A client device 110 may send a request to store, read, search, delete, modify, and/or restore data (e.g., one or more files) stored in the data store 130. Data of a client device 110 may be captured as one or more snapshots of the client device 110 and be stored in the data store 130. The client may be referred to as a user or an end user of the data management server 120. The client device 110 also may be referred to as a user device or an end user device. The client device 110 may include one or more applications 112 and one or more user interfaces 114. The client device 110 may be any computing device. Examples of such client devices 110 include personal computers (PC), desktop computers, laptop computers, tablets (e.g., iPADs), smartphones, wearable electronic devices such as smartwatches, servers (e.g., a file server, a network attached storage server, etc.), or any other suitable electronic devices. The clients may be of different natures such as including individual end users, organizations, businesses, and other clients that use different types of client devices (e.g., target devices) that run on different operating systems.

The applications 112 may be any suitable software applications that operate at the client devices 110. The applications 112 may be of different types. In one case, an application 112 may be a web application that runs on JavaScript or other alternatives, such as TypeScript, etc. In the case of a web application, the application 112 cooperates with a web browser to render a front-end user interface 114. In another case, an application 112 may be a mobile application. For example, the mobile application may run on Swift for iOS and other APPLE operating systems or on Java or another suitable language for ANDROID systems. In yet another case, an application 112 may be a software program that operates on a desktop computer that runs on an operating system such as LINUX, MICROSOFT WINDOWS, MAC OS, or CHROME OS.

In one embodiment, an example application 112 may be provided and controlled by the data management server 120. For example, the company operating the data management server 120 may be a data storage service provider that provides a front-end software application 112 that can be installed, run, or displayed at a client device 110. The application 112 provided by the data management server 120 may automatically perform or allow the user to perform various data management tasks such as capturing one or more snapshots of a device, scheduling capturing of snapshots, facilitating manual backup, uploading of files, downloading of files, requesting for a restore of a device (whether it is the instant device or another device) after a malware attack, and other data management and backup tasks. The applications 112 provided by the data management server 120 may take various forms such as software as a service (SaaS), downloadable applications, free applications, etc. In one case, an example application 112 may be installed at a client device 110 as a background application that performs periodic backup operations and provides additional task options when its user interface 114 is launched. In another case, an application 112 is published and made available by the company operating the data management server 120 at an application store (App store) of a mobile operating system. In yet another case, an end user may go to the company's website and launch a web application for various data management tasks such as backup or snapshot management.

The user interfaces 114 may be any suitable interfaces for receiving inputs from users and for communication with users. When a client device 110 attempts to perform a data management task, the user may communicate to the application 112 and the data management server 120 through the user interface 114. The user interface 114 may take different forms. In one embodiment, the user interface 114 may be a web browser such as CHROME, FIREFOX, SAFARI, INTERNET EXPLORER, EDGE, etc. and the application 112 may be a web application that is run by the web browser. In another application, the user interface 114 is part of the application 112. For example, the user interface 114 may be the front-end component of a mobile application or a desktop application. The user interface 114 also may be referred to as a graphical user interface (GUI) which includes graphical elements to display files such as spreadsheets. In another embodiment, the user interface 114 may not include graphical elements but may communicate with the data management server 120 via other suitable ways such as application program interfaces (APIs).

Figure 7:
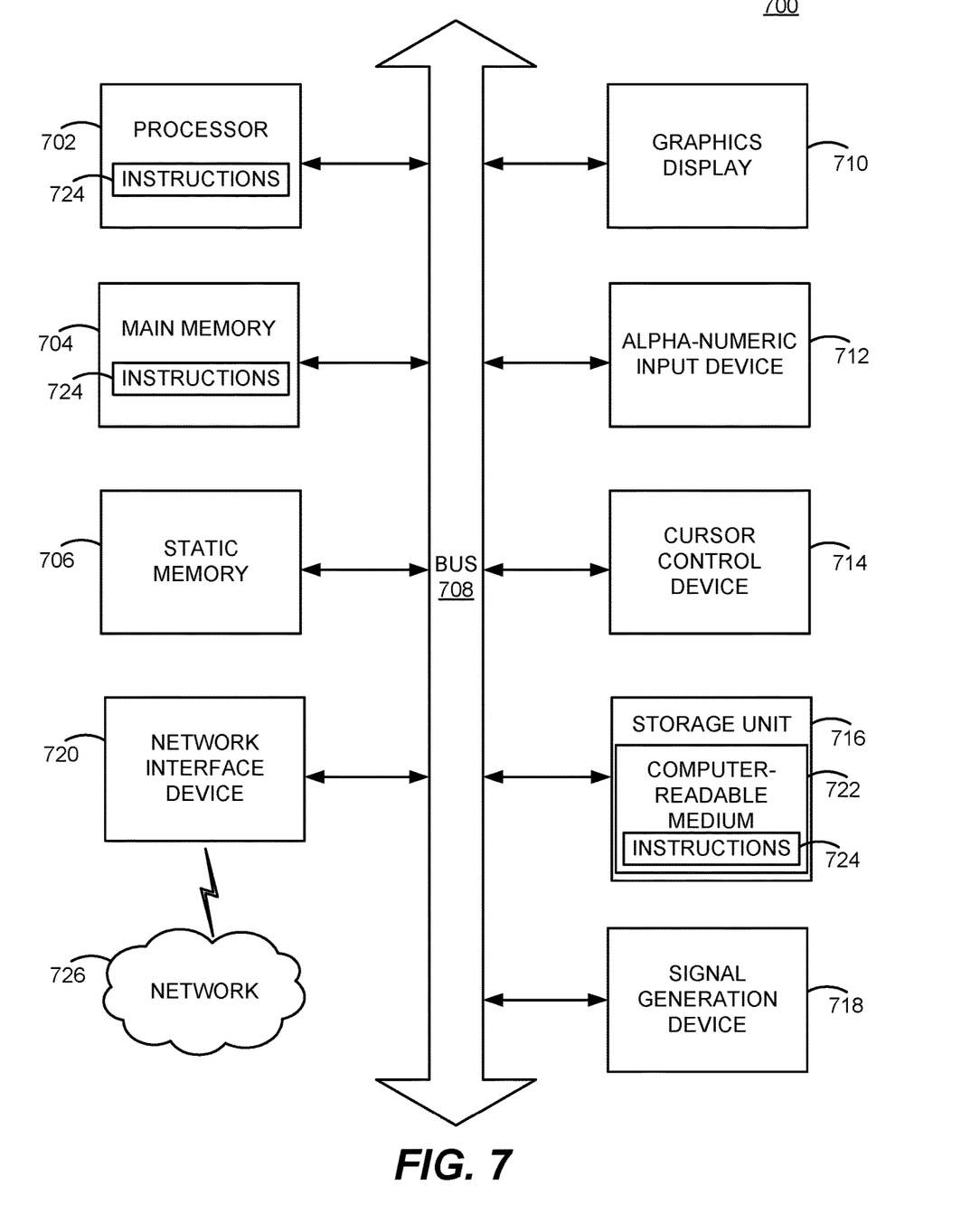
FIG. 7 is a block diagram illustrating components of an example computing machine, in accordance with an embodiment.

The client device 110 may take the form of software, hardware, or a combination thereof (e.g., some or all of the components of a computing machine of FIG. 7).

A data management server 120 may include one or more computing devices that manages data of the data management system 100, performs malware scan, restores data of any client devices 110 after a malware attack. The operator of the data management server 120 may provide software platforms (e.g. online platforms), software applications for installation in the client device 110, application programming interfaces (APIs) for clients to manage backup and restoration of data, etc. In one embodiment, the data management server 120 manages data of the client device 110 that is stored in the data store 130. For example, the data management server 120 may transmit data from the client device 110. In another embodiment, the data management server 120 manages data of the data store 130 that is retrieved and restored in the client device 110. For example, the data management server 120 may transmit data to the client device 110. In this disclosure, data management servers 120 may collectively and singularly be referred to as a data management server 120, even though the data management server 120 may include more than one computing device. For example, the data management server 120 may be a pool of computing devices that may be located at the same geographical location (e.g., a server room) or distributed geographically (e.g., cloud computing, distributed computing, or in a virtual server network).

A computing device of the data management server 120 may take the form of software, hardware, or a combination thereof (e.g., some or all of the components of a computing machine of FIG. 7). For example, parts of the data management server 120 may be a PC, a tablet PC, a smartphone, an internet of things (IoT) appliance, or any machine capable of executing instructions that specify actions to be taken by that machine. Parts of the data management server 120 may include one or more processing units and a memory.

The data store 130 may communicate with the client device 110 via the network 140 for capturing and restoring snapshots and/or files of a client device 110. The data store 130 may also work with the data management server 120 to cooperatively perform data transmission of data to and/or from the client device 110. The data store 130 may include processes running in the data store 130. The data store 130 may include one or more storage units such as memory that may take the form of non-transitory and non-volatile computer storage medium to store various data. A computer readable storage medium is a medium that does not include a transitory medium such as propagating signal or carrier wave. The data store 130 may also be referred to as cloud storage servers. Example cloud storage service providers may include AMAZON AWS, DROPBOX, RACKSPACE CLOUD FILES, AZURE BLOB STORAGE, GOOGLE CLOUD STORAGE, etc. In other cases, instead of cloud storage servers, the data store 130 may be a storage device that is controlled and connected to the data management server 120. For example, the data store 130 may be memory (e.g., hard drives, flash memory, discs, tapes, etc.) used by the data management server 120.

The data store 130 may use different data storage architectures to manage and arrange the data. For example, in some cases, one or more data stores may manage data as a file hierarchy or with sectors and tracks. In some embodiments, the data store 130 may take the form of an object storage system, such as AMAZON S3 and AMAZON GLACIER. Object storage (also known as object-based storage) may be a computer data storage architecture that manages data as objects, as opposed to other storage architectures like file storage which manages data as a file hierarchy. Each object may typically include the data of the object itself, a variable amount of metadata of the object, and a unique identifier that identifies the object. The unique identifier may take the form of a fingerprint (e.g., checksum) of the underlying data of the object itself. Even if only a small number of bits are changed in the underlying data, the fingerprint could be changed significantly. In some implementations of objects, once an object is created, normally it could be difficult to be changed even for a single bit. However, unlike files that often need an operating system of a computer to be accessed, objects may often be accessed directly from a data store and/or through API calls. This allows object storage to scale efficiently in light of various challenges in storing big data.

Each file stored in the data store 130 may include metadata. Metadata is data that describes a file, such as a file name, a file header, a timestamp, version identifier, a file location identifier, a file size, a file directory including timestamp of edit or access dates, ACL checksums, journals including timestamps for change event, etc. The metadata for each file may be stored in the data store 130 as part of the captured snapshots or may be stored separately in a metadata index.

The communications among the client device 110, the target device 120, the data management server 120, and the data store 130 may be transmitted via a network 140, for example, via the Internet. The network 140 provides connections to the components of the system 100 through one or more sub-networks, which may include any combination of local area and/or wide area networks, using both wired and/or wireless communication systems. In one embodiment, a network 140 uses standard communications technologies and/or protocols. For example, a network 140 may include communication links using technologies such as Ethernet, 702.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 140 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 140 may be represented using any suitable format, such as hypertext markup language (HTML), extensible markup language (XML), or JSON. In some embodiments, all or some of the communication links of a network 140 may be encrypted using any suitable technique or techniques such as secure sockets layer (SSL), transport layer security (TLS), virtual private networks (VPNs), Internet Protocol security (IPsec), etc. The network 140 also includes links and packet switching networks such as the Internet.

Example Data Management Server Architecture

Figure 2:
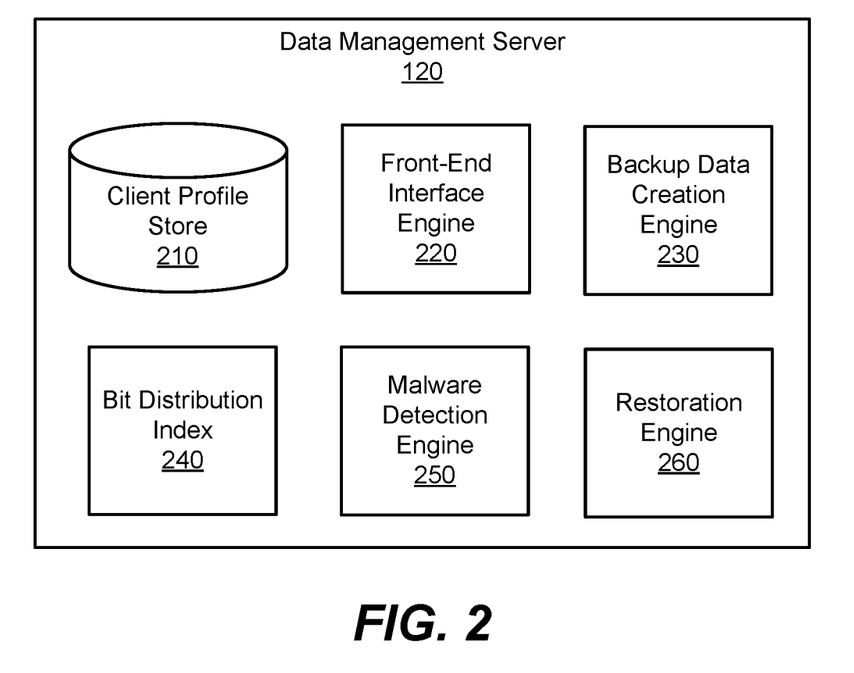
FIG. 2 is a block diagram illustrating an architecture of an example data management server, in accordance with an embodiment.

FIG. 2 is a block diagram illustrating an architecture of an example data management server 120, in accordance with an embodiment. Components of the data management server 120 may be a combination of hardware and software and may include all or a subset of the example computing system illustrated and described with FIG. 7. The data management server 120 may include a client profile store 210, a front-end interface engine 220, a backup data creation engine 230, a bit distribution engine 240, a malware detection engine 250, and a restoration engine 260. In various embodiments, the data management server 120 may include fewer and additional components that are not shown in FIG. 2. For example, in some embodiments, the data store 130 may be part of the data management server 120. In other embodiments, the data store 130 may be operated by an independent party such as a cloud storage provider. In another example, other possible components such as network interfaces, security functions, load balancers, failover servers, management and network operations consoles, and the like are not shown. The functions of the data management server 120 may be distributed among the components in a different manner than described.

The client profile store 210 stores information about the clients, which may include log-in credentials, profile information of clients, and information associated with client devices 110 used by the clients. Each log-in account may be associated with a client identifier that uniquely identifies a client. For example, the user account name (or a version of the user account name such as a hash of the user account) may be used as the unique client identifier of the client. The client identifier may be used to identify data to which the client has access. Data entries corresponding to the data to which the client has access may include the client identifier so that the data management server 120 can control the access of data in the data store 130. In some embodiments, each client profile in the client profile store 210 may also store the index entry identifiers of data blocks to which the client has access.

The front-end interface engine 220 may manage and operate front-end interfaces for clients to manage their files and snapshots. For example, the front-end interface engine 220 may provide a web user interface. When a client visits and logs on to the website of the data management server 120, the front-end interface engine 220 may cause the client device 110 to display a web user interface at the web browser of the client device 110. The front-end interface engine 220 may control the content and information displayed on the website. The front-end interface engine 220 may display files stored in the data store 130 in the forms of graphical elements in the web user interface. In another example, the front-end interface engine 220 may communicate with and control a user interface of an application that runs at the client device 110 to control the content and information of the application. The company operating the data management server 120 may publish the application that is installed at the client device 110. The client may manage files through the user interface of the application. In yet another example, the front-end interface engine 220 may maintain an interface in the form of an application program interface (API) for the client devices 110 to communicate with the data management server 120. The front-end interface engine 220 may also provide customer support services, such as authentication management and maintaining of client preferences.

The backup data creation engine 230 may create backups of data of the client device 110. The backup data creation engine 230 may upload the backup data to the data store 130. A backup operation may be triggered by an action performed at a client device 110 or by an event, may be scheduled as a regular backup, or may be in response to an automated backup task initiated by the data management server 120 to a client device 110. In one embodiment, the backup data creation engine 230 may poll a client device 110 periodically and receive files to be backed up and corresponding metadata, such as file names, file headers, timestamps, version identifiers, access and/or edit timestamps, access control information, and the like. In one embodiment, the backup data creation engine 230 may perform incremental backup operations that leverage data from previous backup cycles to reduce the amount of data to store. The backup data creation engine 230 may store the files of the client device 110 as data blocks in the data store 130. For example, the backup data creation engine 230 may generate a checksum (or another identifiable fingerprint) of a file or a data block to determine whether the file or data block has been captured in previous backup cycles. The backup data creation engine 230 may store files or data blocks that have new checksums and create pointers to refer to files or data blocks that have been captured in previous backup cycles.

The backup data captured from a client device 110 may take the form of snapshots. A backup snapshot may be a set of copies of files that reflect the state of the client device 110 at a particular moment in time. A snapshot, in one example, may be an image of the storage (or a portion of the storage) of a client device 110 that is captured at the particular moment in time. The moment in time may be referred to as a checkpoint. A snapshot may be a complete image or an incremental image. For example, an initial backup of a device may generate a snapshot that captures a complete image of a set of files in the client device 110. Subsequent checkpoints may generate snapshots of incremental images that represent the differential changes of the client device 110. The backup snapshot may additionally include metadata associated with the files, such as file names, file headers, version identifiers, timestamps, and other like metadata. In some embodiment, a snapshot may represent a volume (e.g., a partition of a storage device) of the client device 110. However, in other embodiments, a snapshot may only represent a portion of the client device 110 (e.g., a particular directory, a particular folder, or even a single file). The extent of file coverage of a snapshot may depend on the backup settings of individual client devices 110 and may be different among various client devices 110.

In one embodiment, a snapshot may be divided into data blocks that are saved in various different locations in the data store 130. A data block may be a set of bits that represent data of a file or multiple files. Files may be of various sizes compared to a data block. For example, a large file may include multiple data blocks while a single data block may contain data of a combination of various small files. Data of a file may be retrieved by the identifiers of data blocks (e.g., data blocks' addresses, checksums, etc.) and offsets of the starting and ending data blocks. Various individual data blocks of a snapshot may be stored in different locations of a data store 130 and sometimes may not be grouped. In some data stores 140, a data block may be started in a random location based on the checksum or another identifiable fingerprint of the data block (or the object containing the data block) as the address or identifier of the data block. Some data stores 140 use files as units to save the data instead of dividing files as data blocks that are fixed length.

The bit distribution engine 240 may determine the bit distribution of a file and may store data related to bit distribution threshold values for various file types. The bit distribution threshold values may be utilized by the data management server 120 to determine if a file of a particular file type stored in the data store 130 is affected by ransomware. For example, the bit distribution engine 240 may store a bit distribution threshold value for a pdf file type, a bit distribution threshold value for a word document file type, a bit distribution threshold value for an email message file type, a bit distribution threshold value for a zip file type, and so on.

The malware detection engine 250 may determine a file stored in the data store 130 is malware affected. The malware detection engine 250 may retrieve a first backup snapshot from the data store 130 and determine a file captured in the first backup snapshot is malware affected. In an embodiment, the first backup snapshot may be the most recent backup snapshot (e.g., contains files associated with a most recent timestamp). In other embodiments, the first backup snapshot is any previous backup snapshot stored in the data store 130. In one embodiment, the malware detection engine 250 retrieves the first backup snapshot to determine if a file is malware affected in response to the data management server 120 receiving a request to restore the device. In one example, the request may be provided by the user of the client device 110 via an application (e.g., the application 112) provided and controlled by the data management server 120. In another example, the request may be provided by the application without any user input. In another embodiment, the malware detection engine 250 may automatically retrieve the first backup snapshot to determine if a file is malware affected automatically. For example, the malware detection engine 250 may automatically scan the one or more files captured in a backup snapshot during the capture and storage of the backup snapshot in the data store 130.

Malware may include ransomware and viruses. The malware detection engine 250 may scan for ransomware to determine whether a file captured in a backup snapshot is malware affected. In one example, to scan for ransomware, the malware detection engine 250 identifies a file type for the files captured in the first backup snapshot. In one embodiment, to identify a file type of a file, the malware detection engine 250 may access corresponding metadata (e.g., a file header) of the file to identify the file type. For example, the malware detection engine 250 accesses a header of the file and identifies an extension (e.g., .pdf) which corresponds to the file type being a pdf. In another embodiment, to identify a file type of a file, the malware detection engine 250 may access a subset of data stored within the file (e.g., may access the first 1 kilobyte of data stored within the file) in the data store 130. Based on the subset of data, a file type may be identified. For example, the malware detection engine 250 accesses the subset of data and identifies a magic number (e.g., 25 50 44 46) associated with a particular file type (i.e., a pdf file type). The magic number may be a key header number, a predetermined pattern for a particular file type, or another suitable characteristic of a file type. In another example, the malware detection engine 250 accesses the subset of data and checks the characters (e.g., character strings) found within the subset of data to identify the particular file type.

The malware detection engine 250 may access the bit distribution engine 240 and determine a corresponding bit distribution threshold value for the identified file type (e.g., a corresponding bit distribution threshold value for a pdf file type). The malware detection engine 250 compares the bit distribution of the file to the bit distribution threshold value. Comparing the bit distribution of the file to the threshold bit distribution value may determine the information entropy (Shannon entropy) of the bit distribution of the file. The malware detection engine 250 may determine the file to be affected by ransomware if the bit distribution of the file is greater than the bit distribution threshold value. For example, ransomware often encrypts the bits of a file so that the bits become apparently random. With randomized bits being closer to a uniform distribution of bits, the entropy of the encrypted file often becomes unusually high compared to an unencrypted file whose bits follow certain patterns and are not uniformly distributed.

The malware detection engine 250 may also scan for malware (e.g., ransomware and/or one or more viruses) to determine whether a file captured in a backup snapshot is malware affected. In one example, to scan for viruses, the malware detection engine 250 utilizes known virus detection methods to scan the files captured in the current backup snapshot to determine whether a file is malware affected. For example, various techniques such as static analysis, fingerprint matching, machine learning based algorithms may be used in scanning malware. In some embodiments, the malware detection engine 250 may employ one or more off-the-shell malware scanning software that is available in the market. In other embodiments, the malware detection engine 250 may improve upon some existing malware scanning algorithms.

The malware detection engine 250 continues to scan the files captured in the first backup snapshot for ransomware and/or viruses until a file is determined to be malware affected. Based on the file being identified, the malware detection engine 250 provides a notification to the restoration engine 260 that a file in the first backup snapshot has been identified as malware affected and that a restoration of the device may be necessary. In one embodiment, the malware detection engine 250 may provide the notification to the user of the client device 110 via the application 112.

The restoration engine 260 may provide restoration of data stored in the data store 130 to a client device 110. In one embodiment, the restoration engine 260 may transmit backup snapshots or individual files to a client device 110 when a client is restoring one or more files in case of events such as malware attack, data loss, computer crash, version controls, or other data restoration events. In an embodiment, in response to the notification provided by the malware detection engine 250 that a file captured in the first backup snapshot stored in the data store 130 is malware affected (i.e., affected by ransomware and/or viruses), the restoration engine 260 may check one or more previous backup snapshots to identify a clean version of the file. In another embodiment, the restoration engine 260 may wait until the user provides instructions to check one or more previous backup snapshots to identify a clean version of the file. In one embodiment, once a clean version for the file is identified in a previous snapshot, the restoration engine 260 transmits the identified clean version of the file to the client device 110 to restore the device.

In some embodiments, the restoration engine 260 may check the first backup snapshot and one or more previous backup snapshots to identify a clean version of each file captured in the first backup snapshot. The identification of clean versions of the files is described in further detail with FIGS. 3 and 5A-C. The clean versions of the files may be found in any one of the backup snapshots stored in the data store. For example, the first backup snapshot may include file A, file B, and file C. A clean version of file A and file B may be found in the first backup snapshot and a clean version of file C (the malware affected file) may be found in a previous backup snapshot. In one embodiment, as the clean versions of each file are identified a location (e.g., a file location identifier) of each clean version may be stored in a list. The restoration engine 260 may transmit the clean versions of the files to the client device 110 using the list allowing for faster recovery of the client device 110. Each client device 110 may be associated with different restoration requirements (e.g., recovery time objectives (RTO) requirements) and protocols. The restoration engine 260 may restore the data for the client device 110 based on the requirements and protocols.

The various engines and components shown in FIG. 2 may be a combination of hardware and software that includes instructions, when executed by hardware components such as one or more processors, to perform the functionality. Each engine may include all or a subset of the example computing system illustrated and described with FIG. 7.

Example Restoration Engine Architecture

Figure 3:
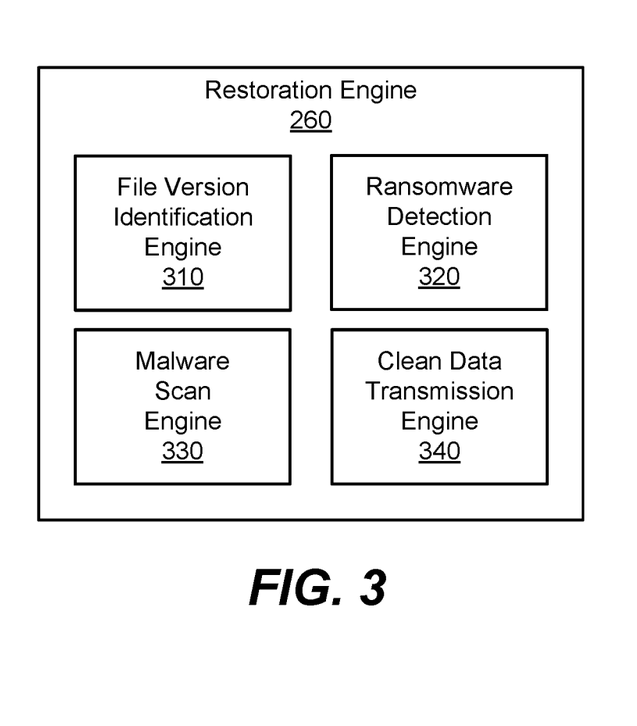
FIG. 3 is a block diagram illustrating an architecture of a restoration engine, in accordance with an embodiment.

FIG. 3 is a block diagram illustrating an architecture of an example restoration engine 260, in accordance with an embodiment. Components of the restoration engine 260 may be a combination of hardware and software and may include all or a subset of the example computing system illustrated and described with FIG. 7. The restoration engine 260 may include a file version identification engine 310, a ransomware detection engine 320, a malware scan engine 330, and a clean data transmission engine 340. In various embodiments, the restoration engine 260 may include additional, fewer, or different components for various applications.

The file version identification engine 310 may identify a previous version of the one or more files (including the malware affected file) of the first backup snapshot in one or more previous backup snapshots. In one embodiment, the file version identification engine 310 may identify a previous version of a file by comparing metadata of the file stored in the first backup snapshot to metadata of a possible previous version of the file stored in a previous backup snapshot. For example, the file version identification engine 310 may compare metadata, such as a file name and/or a file location identifier of the file to a file name and/or a file location identifier of the possible previous version of the file. Based on the metadata of the file stored in the first backup snapshot substantially matching the metadata of the possible previous version of the file, the file version identification engine 310 identifies the possible previous version of the file stored in the previous backup snapshot as the previous version of the file stored in the first backup snapshot.

In another embodiment, the file version identification engine 310 may identify a previous version of a file by comparing data stored in the first backup snapshot to data stored in a previous backup snapshot. The file version identification engine 310 may identify an amount of deleted data based on the comparison (i.e., an amount of data that is stored within the previous backup snapshot and not stored within the first backup snapshot). In one example implementation, the file version identification engine 310 may compare data stored in the first backup snapshot to data stored in a plurality of previous backup snapshots going back in time for a specified duration (e.g., one week, two weeks, one month, etc.). Files present in the previous backup snapshots and not present in the first backup snapshot are deleted data. For the deleted data, the file version identification engine 310 identifies a most recent version of each file based on the metadata (e.g., file name and/or file location) of the file.

The ransomware detection engine 320 may determine if any version of the files stored in the first backup snapshot and/or in the previous backup snapshots are affected by ransomware. In one embodiment, the ransomware detection engine 320 may start by identifying if a file stored in the first backup snapshot is affected by ransomware. In other embodiments, the ransomware detection engine 320 may start by identifying if a version of the file stored in a previous backup snapshot is affected by ransomware. Regardless of where the ransomware detection engine 320 starts (i.e., regardless of which backup snapshot the ransomware detection engine 320 begins with), the ransomware detection engine 320 may determine if a file is ransomware affected.

In one embodiment, the ransomware detection engine 320 may identify a file type for the file. In one embodiment, for the file that was determined to be malware affected by the malware detection engine 250, the malware detection engine 250 may provide the file type of this file to the ransomware detection engine 320. In other embodiments, the ransomware detection engine 320 identifies the file type for all files captured in the backup snapshots. The ransomware detection engine 320 may identify a file type of the file by accessing corresponding metadata (e.g., a file header) of the file to identify the file type. For example, the ransomware detection engine 320 accesses a header of the file and identifies an extension (e.g., .jpeg) which corresponds to the file type being a jpeg file type. In another embodiment, to identify a file type of a file, the ransomware detection engine 320 may access a subset of data stored within the file (e.g., may access the first 1 kilobyte of data stored within the file) in the backup snapshot. For example, the ransomware detection engine 320 accesses the subset of data and identifies a magic number (e.g., FF D8) associated with a particular file type (i.e., a jpeg file type). In another example, the ransomware detection engine 320 accesses the subset of data and checks the characters (e.g., character strings) found within the subset of data to identify the particular file type.

The ransomware detection engine 320 may access the bit distribution engine 240 and determine a corresponding bit distribution threshold value for the identified file type (i.e., a corresponding bit distribution threshold value for a jpeg file type). The ransomware detection engine 320 compares the bit distribution of the file to the bit distribution threshold value. Comparing the bit distribution of the file stored in the first backup snapshot to the threshold bit distribution value determines an entropy of the bit distribution of the file. The ransomware detection engine 320 may determine the file to be affected by ransomware if the bit distribution of the file is greater than the bit distribution threshold value The malware scan engine 330 may determine if any version of the files stored in the first backup snapshot and/or in the previous backup snapshots are affected by malware (e.g., ransomware and/or one or more viruses). In one embodiment, the malware scan engine 330 may start by identifying if a file stored in the first backup snapshot is affected by malware. In other embodiments, the malware scan engine 330 may start by identifying if a version of the file stored in a previous backup snapshot is affected by malware. Regardless of where the malware scan engine 330 starts (i.e., regardless of which backup snapshot the malware scan engine 330 begins with), the malware scan engine 330 may determine if a file is malware affected. The malware scan engine 330 scans for malware in a file using known malware scanning techniques.

The clean data transmission engine 340 may provide a clean version of each file stored in the data store 130 to the client device 110 to restore data in the device. In an embodiment, the ransomware detection engine 320 and the virus detection engine 330 identify a clean version for each file stored in the first backup snapshot and provide the clean versions to the clean data transmission engine 340. The clean versions for each file may copied from various backup snapshots (i.e., a combination of the first backup snapshot and one or more previous backup snapshots) and provided to the device. The clean data transmission engine 340 may utilize a network (e.g., the network 140) to send the clean versions to the device.

Example File Recovery Processes

Figure 4:
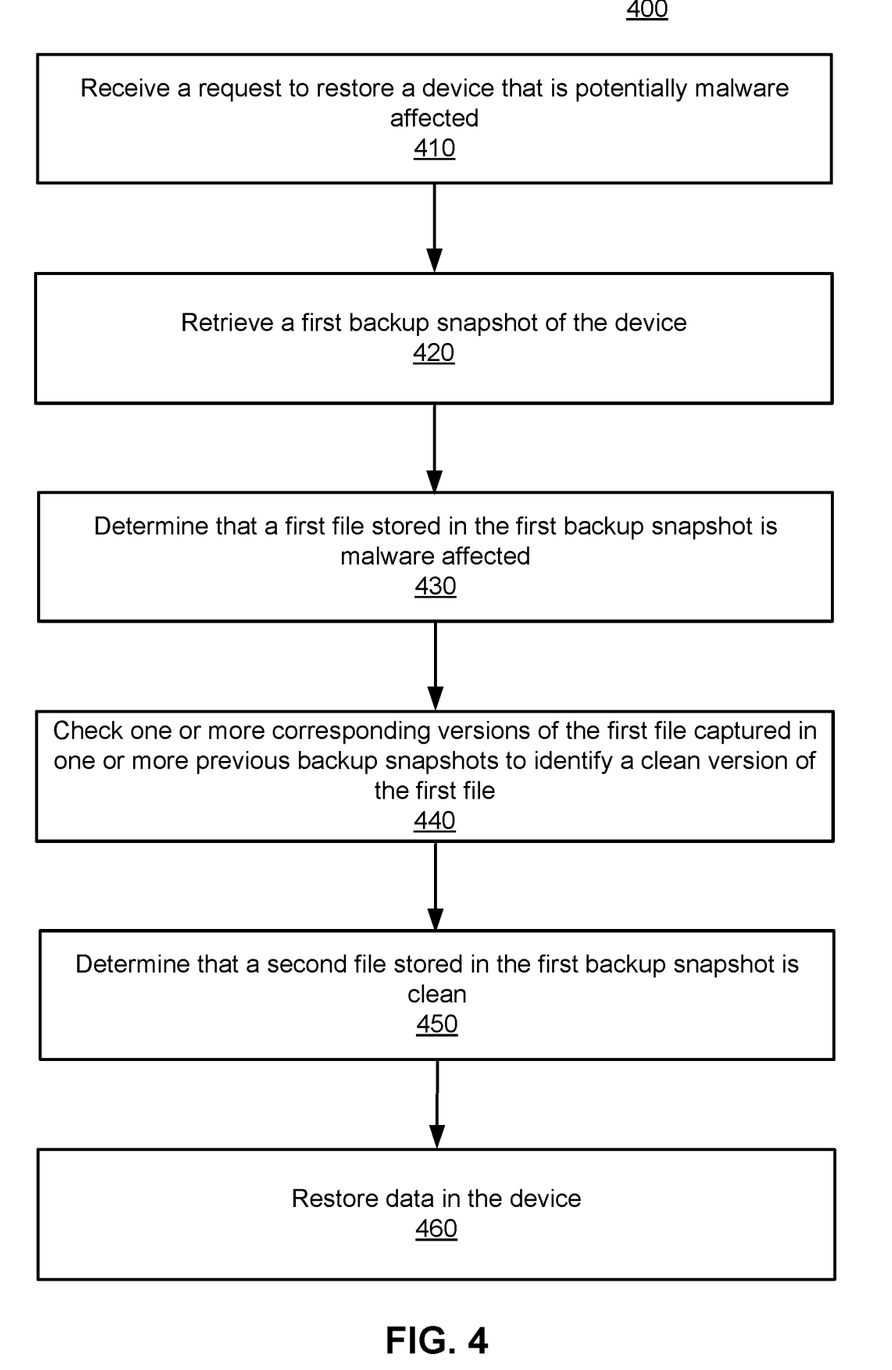
FIG. 4 is a flowchart depicting an example process of file recovery using a data management system, in accordance with an embodiment.

FIG. 4 is a flowchart depicting an example process of file recovery using a data management system, in accordance with an embodiment. The process may be performed to restore data for client devices (e.g., the client devices 110).

In one embodiment, a data management server (e.g., the data management server 120) may capture snapshots from various client devices. The capturing of snapshots may be performed by the data management server (e.g., pulling data from client devices directly or through a backup application installed in the client devices) and may be initiated by the client devices (e.g., pushing data to the data management server or directly to a data store). The data management server may store one or more files in the backup snapshots in a data store (e.g., the data store 130).

The data management server may receive 410 a request to restore a device that is potentially malware affected. In an embodiment, a malware affected device may be victim to a ransomware attack and/or a virus infection. In one embodiment, the request may be provided by a user of the device (e.g., the client device 110). For example, via an application running on the client device, the user may send the request to the data management server. In another embodiment, the request may be provided by a malware detection tool running on the device.

The data management server may retrieve 420 a first backup snapshot of the device. In an embodiment, the first backup snapshot may be the most recent backup snapshot to be stored in the data store. In another embodiment, the first backup snapshot is any backup snapshot stored in the data store.

The data management server may determine 430 that a first file stored in the first backup snapshot is malware affected. In one embodiment, the data management server identifies a file type (e.g., pdf file type, email message file type, jpeg file type, zip file type, etc.) of the first file. In another embodiment, the data management server identifies a file type of the first file by accessing a subset of data stored within the first file and determining the file type of the first file based on the subset of data. The data management server may compare a bit distribution of the first file to a bit distribution threshold value for a file of the same file type stored in a database (e.g., the bit distribution engine 240). Based on the comparison, the data management server determines the first file is malware affected (i.e., affected by ransomware) if the bit distribution for the first file is greater than the threshold bit distribution value. In some embodiments, the data management server determines the first file is malware affected (i.e., affected by ransomware and/or one or more viruses) based on one or more outcomes of known malware scanning techniques.

The data management server may check 440 one or more corresponding versions of the first file captured in one or more previous backup snapshots to identify a clean version of the first file. The data management server may identify a corresponding version of the first file in a previous backup snapshot by comparing file metadata of the first file captured in the first backup snapshot to file metadata of a possible previous version of the first file captured in a previous backup snapshot. If the file metadata is substantially the same, the possible previous version of the first file captured in the previous backup snapshot is determined to be a previous version of the first file. The data management server checks the previous version of the first file to identify whether the previous version of the first file is a clean version of the file. The process of checking a previous version of a file to identify whether the previous version is a clean version is described in further detail with FIG. 5A. To identify a clean version, the data management server may check a previous version of a file for ransomware. This process is described in further detail with FIG. 5B. To identify a clean version, the data management server may check a previous version of a file for malware (e.g., ransomware and/or viruses). This process is described in further detail with FIG. 5C.

The data management server may determine 450 that a second file stored in the first backup snapshot is clean. For example, the data management server determines the version of the second file captured in the first backup snapshot is clean by performing a similar check as described above and in further detail with FIGS. 5A-C. The first file and the second file referred herein may be any files in a device and may not have any relationship with each other. The words "first" and "second" in this context does not necessarily convey any order or relationship.

The data management server may restore 460 data in the device. In an embodiment, the data management server restores a clean version of each file captured in the first backup snapshot and stored in the data store to the device. The restored data (i.e., the clean versions) may be copied from the first backup snapshot and one or more previous backup snapshots. For example, the restored snapshot may be a compilation of files from different versions of backup snapshots.

Example Malware Detection Process

Figure 5A:
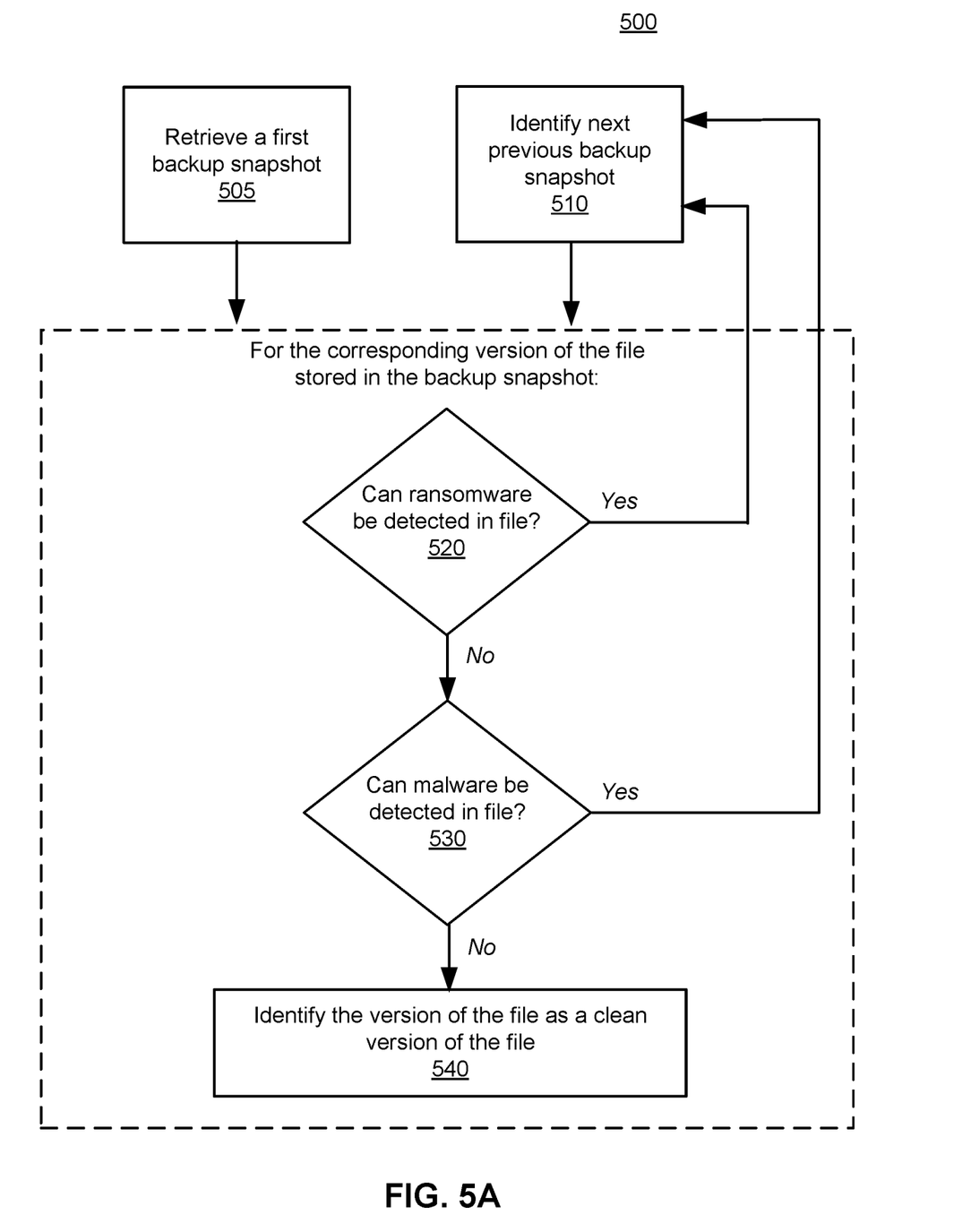
FIG. 5A is a flowchart depicting an example process of malware detection using a data management system, in accordance with an embodiment.

FIG. 5A is a flowchart depicting an example process 500 of malware detection using a data management system. The process 500 may be performed by a data management server (e.g., by the restoration engine 260 of the data management server 120).

The data management server may retrieve 505 a first backup snapshot. The data management server retrieves the first backup snapshot from a data store (e.g., the data store 130). For the corresponding version of the file stored in the first backup snapshot, the data management server determines 520 if ransomware is detected in the file using processes described in further detail with FIG. 5B. If ransomware is not detected in the file, the data management server determines 530 if malware (e.g., ransomware and/or one or more viruses) is detected in the file using processes described in further detail with FIG. 5C. If at any point the data management server determines the file is affected by ransomware or is affected by malware, the data management server identifies 510 the next previous backup snapshot and for the corresponding version of the file stored in this previous backup snapshot, the data management server goes through the process of determining if the file is affected by malware again. This process 500 is performed by the data management server on all files associated with a client device stored in the data store. As the data management server goes through this process for all files associated with the client device, the data management server identifies 540 a version of the file that is considered a clean version of the file. The clean versions of the files may be found in the first backup snapshot and/or in the previous backup snapshots (i.e., in one or more of the previous backup snapshots).

Figure 5B:
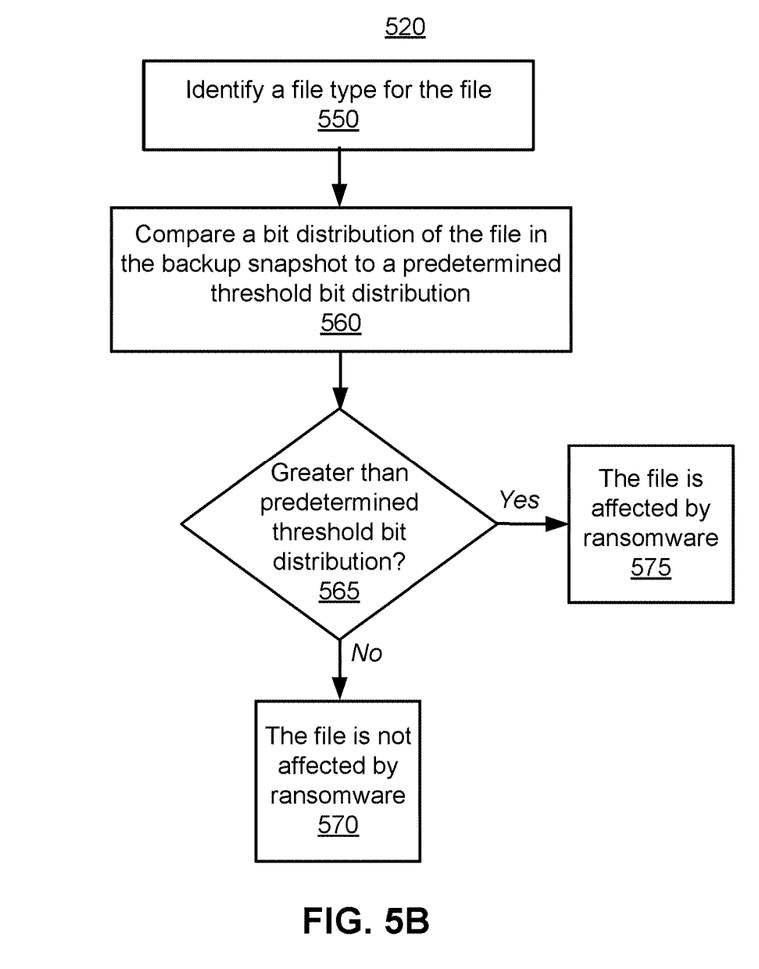
FIG. 5B is a flowchart depicting an example process of ransomware detection using a data management system, in accordance with an embodiment.

FIG. 5B is a flowchart depicting an example process 520 of ransomware detection using a data management system, in accordance with an embodiment. The process 520 may be performed by the data management server. Other processes may also be used for ransomware detection.

The data management server identifies 550 a file type for each file in the first backup snapshot. In one embodiment, to identify a file type of a file, the data management server may access metadata (e.g., a file header) of the file to identify the file type. In another embodiment, to identify a file type of a file, the data management server may access a subset of data stored within the file in the data store. Based on the subset of data, a file type may be identified. In another embodiment, the file type of the file may have been previously determined by the data management server.

The data management server compares 560 a bit distribution of the file in the backup snapshot to a threshold bit distribution value. In an embodiment, the data management server accesses a database that stores threshold bit distribution values for files by file type. The data management server determines 565 whether the bit distribution of the file is greater than the threshold bit distribution value. If the bit distribution of the file is greater 575 than the threshold bit distribution value, the data management server may mark that the file as affected by ransomware. If the bit distribution of the file is less 570 than or equal to the threshold bit distribution value, the data management server may mark that the file as not affected by ransomware.

Figure 5C:
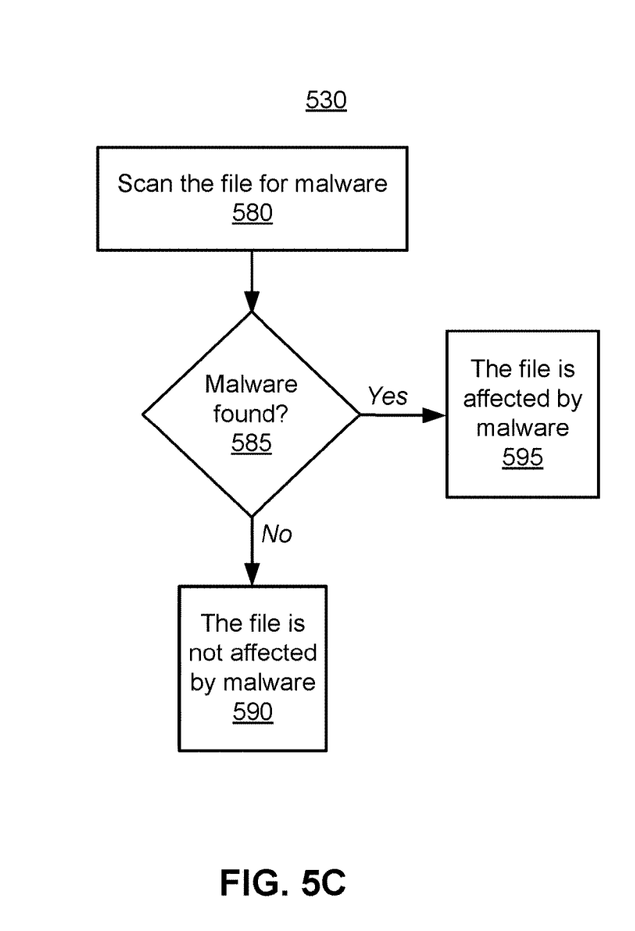
FIG. 5C is a flowchart depicting an example process of virus detection using a data management system, in accordance with an embodiment.

FIG. 5C is a flowchart depicting an example process 530 of scanning for malware using a data management system, in accordance with an embodiment. The process 530 may be performed by the data management server.

The data management server scans 580 the file for malware (e.g., ransomware and/or one or more viruses). The data management server determines 585 if malware is found in the file. If malware is found 595 than the file is affected by malware. If no malware is found 590 than the file is not affected by malware.

Example File Recovery

Figure 6:
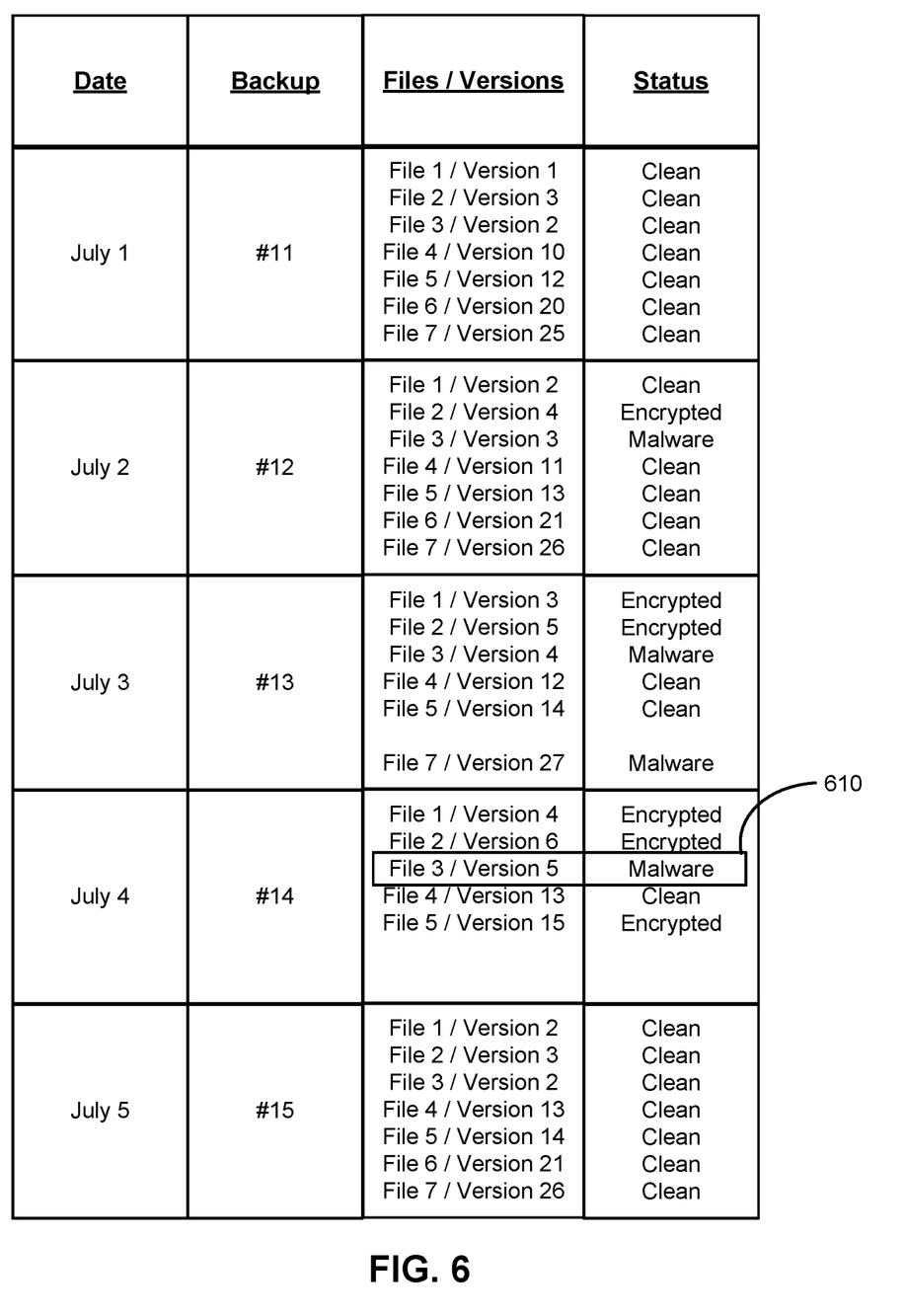
FIG. 6 is a conceptual diagram illustrating an example file recovery from previous snapshots, in accordance with an embodiment.

FIG. 6 is a conceptual diagram illustrating an example file recovery for a malware affected device, in accordance with an embodiment.

In an example embodiment, a device is being backed up every day. Each day (e.g., July 1, July 2, and so on) a plurality of files stored on the device are captured in a backup snapshot (e.g., #11, #12, and so on) and stored in a data store (e.g., the data store 130). The backup snapshot #11 includes seven files with corresponding version identifiers. At the time of backup snapshot #11, all seven files are considered clean versions (i.e., the files are not encrypted and/or malware affected). At the time of backup snapshot #12, five files are considered clean versions, one file is encrypted, and one file is malware affected. At the time of backup snapshot #13, two files are considered clean versions, two files are encrypted, two files are malware affected, and one file has been deleted. At the time of backup snapshot #14, one file is considered a clean version, three files are encrypted, one file is malware affected, and two files have been deleted.

In the example embodiment, on July 4$^{th}$, it becomes evident that the device may be potentially malware affected. For example, a malware detection tool operating on the device may perform a scan of the plurality of files stored on the device. The scan of File 3/Version 5 610 may trigger the malware detection tool to determine that the device is malware affected. In another example, a user of the device may determine the device is malware affected when the user interacts with (e.g., opens, reads, edits, etc.) file 3/version 5 610. Regardless of how the device is determined to be malware affected, a request is sent to a data management server (e.g., the data management server 120) to restore the device to a state (i.e., a clean state) prior to it becoming malware affected.

In the example embodiment, the data management server retrieves a first backup snapshot of the device. For example, the data management server may retrieve the most recent backup snapshot (i.e., backup snapshot #14). In another example, the data management server may retrieve a backup snapshot that took place any time prior to the determination that the device may be malware affected. The data management server determines that at least one file captured in the backup snapshot is malware affected. For example, the data management server determines file 3/version 5 610 is malware affected.

In the example embodiment, the data management server checks other versions of the malware affected file in one or more previous backup snapshots to identify a clean version of the malware affected file. For example, the data management server retrieves snapshot #13 and checks file 3/version 4 to determine if this file is malware affected. It is malware affected; thus, the data management server retrieves snapshot #12 and checks file 3/version 3 to determine if this file is malware affected. It is malware affected; thus, the data management server retrieves snapshot #11 and checks file 3/version 2 to determine if this file is malware affected. It is not, so file 3/version 2 is identified as the clean version of this file.

In the example embodiment, the data management server checks the other files captured in backup snapshot #14 to determine if any of them are clean versions. For example, the data management server checks file 1/version 4, file 2/version 6, file 4/version 13, and file 5/version 15 to identify if any of these files are clean versions. File 4/version 13 is determined to be clean. File 1/version 4, file 2/version 6, and file 5/version 15 are determined to be encrypted with the encryption due to the malware affected file. As such, the data management server checks other versions of the encrypted files to identify a clean version for each. For example, the data management server identifies file 1/version 2 stored in previous backup snapshot #12 as the clean version for file 1/version 4.

In the example embodiment, the data management server identifies deleted data in previous backup snapshot #13 and in previous backup snapshot #12. For example, the data management server checks the files captured in backup snapshot #13 and identifies data stored in backup snapshot #13 that was not stored in backup snapshot #14. The data is file 7/version 27. The data management server checks this file to determine if the file is clean and determines the file to be malware affected. The data management server may check the backup snapshot #12 to see whether file 7/version 26 is malware affected. This file/version is determined to be clean. During the data management server check of backup snapshot #12, additional deleted data is identified. For example, the data management server checks the files captured in backup snapshot #12 and identifies data stored in backup snapshot #12 that was not stored in backup snapshot #13. The data is file 6/version 21. The data management server checks this file to determine if the file is clean and determines the file to be a clean version.

In the example embodiment, once all clean versions for the files have been determined, the data management server restores data in the device. The restored data comprises a clean version of the malware affected file restored from a previous backup snapshot (i.e., backup snapshot #11), clean versions of the encrypted files restored from previous backup snapshots, clean versions of the deleted files restored from previous backup snapshots, and the version of the file determined to be clean in the first backup snapshot. This can be seen in the next backup snapshot (i.e., backup snapshot #15) that takes place after the device restoration where a clean version of the files is captured and stored in the data store.

Computing Machine Architecture

FIG. 7 is a block diagram illustrating components of an example computing machine that is capable of reading instructions from a computer readable medium and execute them in a processor. A computer described herein may include a single computing machine shown in FIG. 7, a virtual machine, a distributed computing system that includes multiples nodes of computing machines shown in FIG. 7, or any other suitable arrangement of computing devices.

By way of example, FIG. 7 shows a diagrammatic representation of a computing machine in the example form of a computer system 700 within which instructions 724 (e.g., software, program code, or machine code), which may be stored in a computer readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 7 may correspond to any software, hardware, or combined components shown in FIGS. 1-3, including but not limited to, the client device 110, the data management server 120, and various engines, interfaces, terminals, and machines shown in FIGS. 2 and 3. While FIG. 7 shows various hardware and software elements, each of the components described in FIGS. 1-3 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 724 that specify actions to be taken by that machine. Further, while only a single machine is illustrated, the term "machine" and "computer" also may be taken to include any collection of machines that individually or jointly execute instructions 724 to perform any one or more of the methodologies discussed herein.

The example computer system 700 includes one or more processors 702 such as a CPU (central processing unit), a GPU (graphics processing unit), a TPU (tensor processing unit), a DSP (digital signal processor), a system on a chip (SOC), a controller, a state equipment, an application-specific integrated circuit (ASIC), a field-programmable gate array (FPGA), or any combination of these. Parts of the computing system 700 also may include memory 704 that store computer code including instructions 724 that may cause the processors 702 to perform certain actions when the instructions are executed, directly or indirectly by the processors 702. Memory 704 may be any storage devices including non-volatile memory, hard drives, and other suitable storage devices. Instructions can be any directions, commands, or orders that may be stored in different forms, such as equipment-readable instructions, programming instructions including source code, and other communication signals and orders. Instructions may be used in a general sense and are not limited to machine-readable codes.

One and more methods described herein improve the operation speed of the processors 702 and reduces the space required for the memory 704. For example, the architecture and methods described herein reduce the complexity of the computation of the processors 702 by applying one or more novel techniques that simplify the steps generating results of the processors 702 and reduce the cost of restoring data. The algorithms described herein also reduce the storage space requirement for memory 704.

The performance of certain of the operations may be distributed among the more than processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations. Even though in the specification or the claims may refer some processes to be performed by a processor, this should be construed to include a joint operation of multiple distributed processors.

The computer system 700 may include a main memory 704, and a static memory 706, which are configured to communicate with each other via a bus 708. The computer system 700 may further include a graphics display unit 710 (e.g., a plasma display panel (PDP), a liquid crystal display (LCD), a projector, or a cathode ray tube (CRT)). The graphics display unit 710, controlled by the processors 702, displays a graphical user interface (GUI) to display one or more results and data generated by the processes described herein. The computer system 700 also may include alphanumeric input device 712 (e.g., a keyboard), a cursor control device 714 (e.g., a mouse, a trackball, a joystick, a motion sensor, or other pointing instrument), a storage unit 716 (a hard drive, a solid state drive, a hybrid drive, a memory disk, etc.), a signal generation device 718 (e.g., a speaker), and a network interface device 720, which also are configured to communicate via the bus 708.

The storage unit 716 includes a computer readable medium 722 on which is stored instructions 724 embodying any one or more of the methodologies or functions described herein. The instructions 724 also may reside, completely or at least partially, within the main memory 704 or within the processor 702 (e.g., within a processor's cache memory) during execution thereof by the computer system 700, the main memory 704 and the processor 702 also constituting computer readable media. The instructions 724 may be transmitted or received over a network 726 via the network interface device 720.

While computer readable medium 722 is shown in an example embodiment to be a single medium, the term "computer readable medium" should be taken to include a single medium or multiple media (e.g., a centralized or distributed database, or associated caches and servers) able to store instructions (e.g., instructions 724). The computer readable medium may include any medium that is capable of storing instructions (e.g., instructions 724) for execution by the processors (e.g., processors 702) and that causes the processors to perform any one or more of the methodologies disclosed herein. The computer readable medium may include, but not be limited to, data repositories in the form of solid-state memories, optical media, and magnetic media. The computer readable medium does not include a transitory medium such as a propagating signal or a carrier wave.

Additional Considerations

Beneficially, the systems and processes described herein improve the efficiency and reduce the cost of data retrieval and/or restoration. A large amount of data in a client device may be captured in backup snapshots and stored in a data store. With malware attacks taking placing over long periods of time and potentially not be detected by the client device or a data management system until after several backup snapshots are captured and stored, restoring the device with relevant (timely) data can be challenging. By identifying a clean version of each file captured in the most recent backup snapshots as possible, the data management system restores relevant data; thus, improving the RPO for the user and decreasing the costs associated with data restoration. Costs may be direct monetary costs to be spent to perform an action (e.g., read, write, store) or other costs such as computer resources and time in performing an action. The restoration of clean versions of the files from previous backup snapshots, as opposed to clean versions of the files from just one previous backup snapshot, provides more useful data to the user in a data restoration.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any feature mentioned in one claim category, e.g. method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter may include not only the combinations of features as set out in the disclosed embodiments but also any other combination of features from different embodiments. Various features mentioned in the different embodiments can be combined with explicit mentioning of such combination or arrangement in an example embodiment or without any explicit mentioning. Furthermore, any of the embodiments and features described or depicted herein may be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In one embodiment, a software engine is implemented with a computer program product comprising a computer readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure. Likewise, any use of (i), (ii), (iii), etc., or (a), (b), (c), etc. in the specification or in the claims, unless specified, is used to better enumerate items or steps and also does not mandate a particular order.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A. In claims, the use of a singular form of a noun may imply at least one element even though a plural form is not used.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A computer-implemented method, comprising:
   receiving a request to restore a device that is potentially malware affected, the device associated with a plurality of backup snapshots that capture states of the device at different times;
   retrieving a first backup snapshot of the device;
   determining that a first file stored in the first backup snapshot is malware affected;
   checking one or more corresponding versions of the first file captured in one or more previous backup snapshots to identify a clean version of the first file, wherein checking one or more corresponding versions of the first file captured in one or more previous backup snapshots to identify the clean version of the first file comprises:
      identifying a previous version of the first file stored in a previous backup snapshot by:
         comparing data stored in the first backup snapshot to data stored in the previous backup snapshot,
         identifying an amount of deleted data based on the comparison, the deleted data being stored within the previous backup snapshot,
         associating the deleted data stored within the previous backup snapshot with the first file based in part on metadata of the first file, and
         based on the association, identifying the previous version of the first file stored in the previous backup snapshot; and
      checking the identified previous version of the first file to identify whether the identified previous version of the first file is the clean version of the first file;
   determining that a second file stored in the first backup snapshot is clean; and restoring data in the device, the restored data comprising the clean version of the first file restored from a previous backup snapshot and the second file restored from the first backup snapshot.

2. The computer-implemented method of claim 1, wherein determining that the first file stored in the first backup snapshot is malware affected comprises:
identifying a file type for the first file;
comparing a bit distribution of the first file stored in the first backup snapshot to a predetermined threshold bit distribution, the predetermine threshold bit distribution associated with the file type; and
determining that the first file stored in the first backup snapshot is malware affected when the bit distribution is greater than the predetermined threshold bit distribution.

3. The computer-implemented method of claim 2, further comprising checking one or more corresponding versions of a second file captured in one or more previous backup snapshots to identify a clean version of the second file, wherein identifying the clean version of the second file comprises:
comparing a bit distribution of a version of the second file stored in a previous backup snapshot to the predetermined threshold bit distribution; and
identifying the version of the second file is clean when the bit distribution is less than or equal to the predetermined threshold bit distribution.

4. The computer-implemented method of claim 2, wherein identifying the file type for the first file comprises:
accessing metadata describing the first file, the metadata being stored in the first backup snapshot; and
identifying the file type of the first file based on the metadata.

5. The computer-implemented method of claim 2, wherein identifying the file type for the file comprises:
accessing a subset of data stored within the first file; and
identifying the file type based on the subset of data.

6. The computer-implemented method of claim 2, wherein comparing the bit distribution of the first file stored in the first backup snapshot to the predetermined threshold bit distribution comprises determining an entropy of the bit distribution of the first file.

7. The computer-implemented method of claim 1, wherein a malware affected file is encrypted by ransomware or infected by malware.

8. The computer-implemented method of claim 1, wherein the first backup snapshot is a most recent backup snapshot.

9. The computer-implemented method of claim 1, further comprising checking one or more corresponding versions of a second file captured in one or more previous backup snapshots to identify a clean version of the second file, wherein identifying the clean version of the second file comprises:
identifying a previous version of the second file stored in a previous backup snapshot by:
comparing metadata of the second file stored in the first backup snapshot to metadata of a possible previous version of the second file stored in the previous backup snapshot; and
based on the metadata of the second file stored in the first backup snapshot substantially matching the metadata of the possible previous version of the second file, identifying the possible previous version of the second file as the previous version of the second file; and
checking the identified previous version of the second file to identify whether the identified previous version of the second file is the clean version of the second file.

10. The computer-implemented method of claim 1, further comprising checking one or more corresponding versions of a second file captured in one or more previous backup snapshots to identify a clean version of the second file, wherein identifying the clean version of the second file comprises:
scanning a version of the second file stored in a previous backup snapshot for one or more viruses; and
based on the scan, identifying whether the version of the second file is a clean version.

11. A system comprising:
a data store configured to store a plurality of backup snapshots that capture states of a device at different times;
a data management server configured to:
receive a request to restore the device that is potentially malware affected;
retrieve a first backup snapshot of the device;
determine that a first file stored in the first backup snapshot is malware affected;
check one or more corresponding versions of the first file captured in one or more previous backup snapshots to identify a clean version of the first file, wherein checking one or more corresponding versions of the first file captured in one or more previous backup snapshots to identify the clean version of the first file comprises:
identifying a previous version of the first file stored in a previous backup snapshot by:
comparing data stored in the first backup snapshot to data stored in the previous backup snapshot,
identifying an amount of deleted data based on the comparison, the deleted data being stored within the previous backup snapshot,
associating the deleted data stored within the previous backup snapshot with the first file based in part on metadata of the first file, and
based on the association, identifying the previous version of the first file stored in the previous backup snapshot, and
checking the identified previous version of the first file to identify whether the identified previous version of the first file is the clean version of the first file;
determine that a second file stored in the first backup snapshot is clean; and
restore data in the device, the restored data comprising the clean version of the first file restored from a previous backup snapshot and the second file restored from the first backup snapshot.

12. The system of claim 11, wherein the data management server determines that the first file in the first backup snapshot is malware affected by being further configured to:
identify a file type for the first file;
compare a bit distribution of the first file stored in the first backup snapshot to a predetermined threshold bit distribution, the predetermine threshold bit distribution associated with the file type; and
determine that the first file stored in the first backup snapshot is malware affected when the bit distribution is greater than the predetermined threshold bit distribution.

13. The system of claim 12, wherein the data management server is further configured to check one or more corresponding versions of a second file captured in one or more previous backup snapshots to identify a clean version of the second file, wherein identifying the clean version of the second file comprises:
 compare a bit distribution of a version of the second file stored in a previous backup snapshot to the predetermined threshold bit distribution; and
 identify the version of the second file is clean when the bit distribution is less than or equal to the predetermined threshold bit distribution.

14. The system of claim 12, wherein that data management server identifies the file type for the first file by being further configured to:
 access metadata describing the first file, the metadata being stored in the first backup snapshot; and
 identify the file type of the first file based on the metadata.

15. The system of claim 12, wherein that data management server identifies the file type for the first file by being further configured to:
 access a subset of data stored within the first file; and
 identify the file type based on the subset of data.

16. The system of claim 11, wherein the data management server is further configured to check one or more corresponding versions of a second file captured in one or more previous backup snapshots to identify a clean version of the second file, wherein identifying the clean version of the second file comprises:
 identify a previous version of the second file stored in a previous backup snapshot by being configured to:
  compare metadata of the second file stored in the first backup snapshot to metadata of a possible previous version of the second file stored in the previous backup snapshot; and
  based on the metadata of the second file stored in the first backup snapshot substantially matching the metadata of the possible previous version of the second file, identify the possible previous version of the second file as the previous version of the second file; and
 check the identified previous version of the second file to identify whether the identified previous version of the second file is the clean version of the second file.

17. The system of claim 11, wherein the data management server is further configured to check one or more corresponding versions of a second file captured in one or more previous backup snapshots to identify a clean version of the second file, wherein identifying the clean version of the second file comprises:
 scan a version of the second file stored in a previous backup snapshot for one or more viruses; and
 based on the scan, identify whether the version of the second file is a clean version.

18. A non-transitory computer readable medium storing computer code comprising instructions that, when executed by at least one processor, cause the at least one processor to:
 receive a request to restore a device that is potentially malware affected, the device associated with a plurality of backup snapshots that capture states of the device at different times;
 retrieve a first backup snapshot of the device;
 determine that a first file stored in the first backup snapshot is malware affected;
 check one or more corresponding versions of the first file captured in one or more previous backup snapshots to identify a clean version of the first file, wherein checking one or more corresponding versions of the first file captured in one or more previous backup snapshots to identify the clean version of the first file comprises:
  identifying a previous version of the first file stored in a previous backup snapshot by:
   comparing data stored in the first backup snapshot to data stored in the previous backup snapshot,
   identifying an amount of deleted data based on the comparison, the deleted data being stored within the previous backup snapshot,
   associating the deleted data stored within the previous backup snapshot with the first file based in part on metadata of the first file, and
   based on the association, identifying the previous version of the first file stored in the previous backup snapshot; and
  checking the identified previous version of the first file to identify whether the identified previous version of the first file is the clean version of the first file;
 determine that a second file stored in the first backup snapshot is clean; and
 restore data in the device, the restored data comprising the clean version of the first file restored from a previous backup snapshot and the second file restored from the first backup snapshot.

\* \* \* \* \*